United States Patent
Lehmann et al.

(10) Patent No.: US 6,190,564 B1
(45) Date of Patent: Feb. 20, 2001

(54) TWO-STAGE SEPARATION PROCESS

(75) Inventors: Richard W. Lehmann, Rib Mountain; Russell G. Forbess, Weston, both of WI (US)

(73) Assignee: United States Filter Corporation, Desert, CA (US)

(*) Notice: Under 35 U.S.C. 154(b), the term of this patent shall be extended for 0 days.

(21) Appl. No.: 09/164,557

(22) Filed: Oct. 1, 1998

(51) Int. Cl.[7] .................................................. C02F 1/74
(52) U.S. Cl. ..................... 210/741; 210/743; 210/761; 210/110; 210/120; 210/134; 210/137
(58) Field of Search .................................. 210/761, 743, 210/741, 120, 110, 134, 137

(56) References Cited

U.S. PATENT DOCUMENTS

| | | | |
|---|---|---|---|
| 2,944,396 | * | 7/1960 | Barton . |
| 5,106,513 | * | 4/1992 | Hong ..................... 210/759 |
| 5,183,577 | * | 2/1993 | Lehmann ............... 210/761 |
| 5,230,810 | * | 7/1993 | Clark et al. ............ 210/743 |
| 5,240,619 | * | 8/1993 | Copa et al. . |
| 5,534,148 | * | 7/1996 | Suzuki et al. ......... 210/605 |
| 5,651,897 | * | 7/1997 | Lehmann . |
| 5,674,405 | * | 10/1997 | Bourhis ................ 210/761 |

* cited by examiner

Primary Examiner—Chester T. Barry
(74) Attorney, Agent, or Firm—Wolf, Greenfiled & Sacks, P.C.

(57) ABSTRACT

A process is disclosed for producing an oxidized liquid effluent containing minimal dissolved gases therein, from a subcritical wet oxidation treatment system. The oxidation mixture exiting from the treatment system is separated into a first oxidized liquid effluent and a first gaseous phase as the mixture a first separator vessel operated at a relatively low superatmospheric pressure. Sufficient pressure is maintained in the first gaseous phase to provide the motive force for transport to further treatment or discharge. The first oxidized liquid effluent flows to a second separator vessel operated at essentially atmospheric pressure, where remaining dissolved gases separate from the first oxidized liquid effluent. The second gaseous phase is discharged and the second oxidized liquid effluent is suitable for storage or further treatment. Provision for adjusting the pH of the oxidized liquid effluent during the separation process is also disclosed.

23 Claims, 1 Drawing Sheet

TWO-STAGE SEPARATION PROCESS

This application claims the benefit of international application PCT/US/97/05233, filed on Mar. 31, 1997, which designates the United States and claims the benefit of application Ser. No. 08/617,711, filed on Apr. 1, 1996, now abandoned.

BACKGROUND

1. Field of the Invention

The present invention is directed to a separation process for an oxidized liquid effluent mixture from a subcritical wet oxidation process and, more particularly, to a two-stage separation process for separating the oxidized liquid effluent mixture.

2. Description of the Related Art

Wet oxidation is well known for the treatment of aqueous wastewaters. The process generally involves heating a mixture of the wastewater and an oxygen-containing gas to effect oxidation of oxidizable substances contained in the wastewater. When air is used as the source of oxygen-containing gas, the wet oxidation process is generally referred to as "wet air oxidation."

Generally, subcritical wet oxidation systems include a wet oxidation chamber followed by a single separator vessel, with a pressure control valve therebetween to maintain the oxidation chamber pressure. When the oxidation process is terminated, an oxidized effluent mixture traverses the pressure control valve to the separator vessel. The pressure drop between the wet oxidation system and the separator vessel causes the mixture to separate into an oxidized liquid effluent and a gaseous phase.

Low pressure separators generally operate at, or near, ambient pressure. If a single low pressure separator vessel follows the wet oxidation system, the oxidized liquid effluent is generally acceptable for downstream processes (such as for pumping, or for storage in tanks). However, the gaseous phase produced from a single low pressure separation vessel is disadvantageous because it is at a low pressure, and requires additional equipment and energy to transport to downstream processes. In some instances, the gaseous phase may require further treatment, and potentially the expenditure of significant amounts of energy and expense for transport to and through subsequent treatment processes. Moreover, the gaseous phase from a single low pressure separator vessel generally contains a significant amount of water vapor. The water vapor also adds expense to downstream treatment of the gaseous phase, for example, increasing the energy requirement in a high temperature afterburner. Condensation of the water vapor on the interior of equipment may also cause corrosion to the equipment that comes into contact with the gaseous phase.

High pressure separators generally operate in the range of about 50 to 100 psig. If a single high pressure separation vessel is used, the energy expenditure for moving the gas would be eliminated, as the gaseous phase would retain sufficient pressure to provide the motive force to be transported to another location. However, in this instance, the oxidized liquid effluent may not be suitable for discharge to downstream processes, because the over pressure may cause a significant amount of gases, including $CO_2$, $N_2$, and $O_2$, to remain dissolved in the oxidized liquid effluent. When such as oxidized liquid effluent is stored in a low pressure covered collection tank, for example, the dissolved gases remaining therein will come out of solution and collect within the talk, causing operational problems. Several techniques associated with various high pressure or temperature processes, including wet oxidation, are reported below.

U.S. Pat. No. 3,150,105 discloses a blow down talk to receive cooled regenerated carbon slurry from a wet oxidation reactor.

U.S. Pat. No. 3,994,702 discloses a flooded sluicing chamber for ash removal from a pressurized gasification chamber.

U.S. Pat. No. 4,620,563 discloses a blowdown pot with an inlet pressure control valve through which the pot receives unwanted residue e.g., ash from a high pressure chemical reactor.

U.S. Pat. No. 5,011,114 discloses a pressure control valve with a valve seat and support assembly extending beyond the valve body to prevent erosion by the blowdown slurry.

U.S. Pat. No. 5,389,264 discloses a process for dissipating the energy of a wet oxidation mixture and preventing erosion of the phase separator vessel after that stream traverses a pressure control valve.

A need remains, however, for an improved process for providing an essentially gasfree oxidized liquid effluent with a gaseous phase with a reduced water vapor concentration, from a subcritical wet oxidation system. Lastly, there is a need to reduce or eliminate the energy requirement for transporting the gaseous phase to further treatment.

SUMMARY OF THE INVENTION

The present invention is directed to a process for separating the discharge from a subcritical wet oxidation process. The process involves providing an oxidized liquid effluent mixture by reacting an aqueous waste stream containing oxidizable materials with an oxidant at a first superatmospheric pressure. A first oxidized liquid effluent and a first gaseous phase are provided by subjecting the oxidized liquid effluent mixture to a first pressure drop from the first superatmospheric pressure to a second superatmospheric pressure. A second oxidized liquid effluent and a second gaseous phase are provided by subjecting the first oxidized liquid effluent to a second pressure drop from the second superatmospheric pressure to essentially atmospheric pressure. The pressure exerted on the first gaseous phase provides energy for transporting the first gaseous phase from a first location to a second location.

In another aspect of the invention, the process involves separating the discharge from a subcritical wet oxidation process. The process involves discharging a cooled wet oxidation mixture of liquid and gases from a subcritical wet oxidation system operating at superatmospheric pressure, through a first pressure control valve to a first separator vessel maintained at a superatmospheric pressure lower than the oxidation system, to form a superatmospheric first gaseous phase and a first oxidized liquid effluent therein. The superatmospheric first gaseous phase is discharged from the first separator vessel to further treatment or to the environment. The first oxidized liquid effluent is discharged from the first separator vessel, through a first level control valve for controlling the liquid level in the first separator vessel, to a second separator vessel maintained at essentially atmospheric pressure, to form a second gaseous phase and an essentially degassed second oxidized liquid effluent therein. The second gaseous phase is discharged from the second separator vessel, and the essentially degassed second oxidized liquid effluent is discharged from the second separator vessel.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

Figure 1:
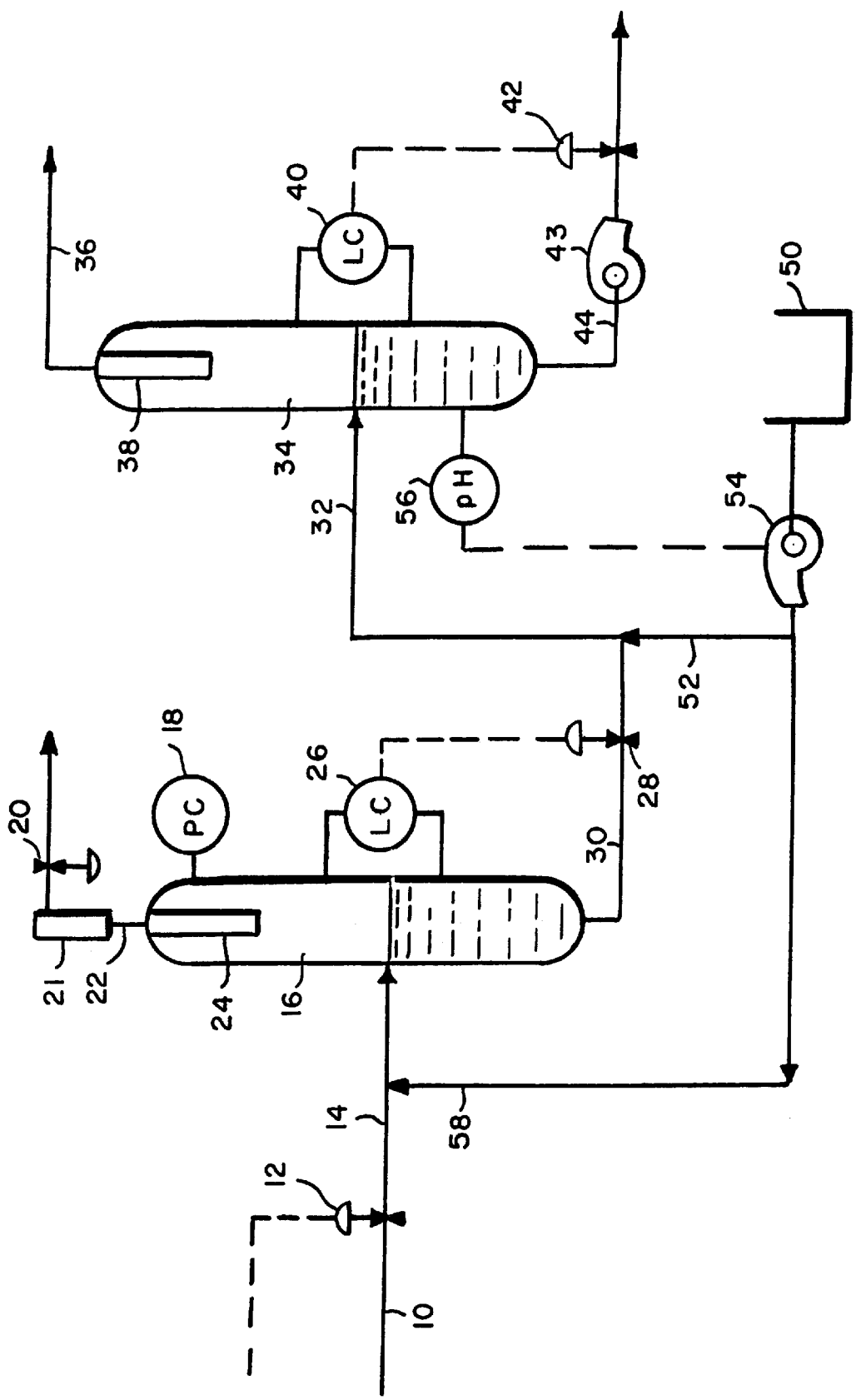
FIG. 1 is a schematic illustration of a wet oxidation system including the separation system of the present invention.

The present invention is directed to an improved separation process for treating the oxidized effluent from a subcritical wet oxidation system to provide an essentially gas-free oxidized liquid effluent and a gaseous phase with a reduced water content. The process also reduces or eliminates the energy requirement for transporting the gaseous phase from a first location to a second location for further treatment, to the environment, or to waste.

"Sub-critical wet oxidation," as used herein, is used as it is known in the art, which is as a "moderate" treatment process performed at a temperature below the critical temperature of water, and at a superatmospheric pressure below the critical pressure of water. The critical temperature of water is 374° C. and the critical pressure of water is 3193 psig (217 atm(g)). Typical operating conditions for wet oxidation systems include temperatures ranging from about 150° C. to about 350° C., and pressures of at least about 100 psig (6.8 atm(g)) up to about 3,500 psig (238 atm(g)). "Gage pressure," is used herein conventionally, meaning that the pressure values are with reference to atmospheric pressure.

The destruction of organics via subcritical wet oxidation processes takes place through oxidation/reduction reactions, typically providing oxidation efficiencies in the range of about 50 to 80 percent. Therefore, discharges from subcritical wet oxidation processes may require further treatment to remove residual organics before they can be discharged to the environment, or other downstream processes. As described previously, the discharge from a subcritical wet oxidation system is generally separated into an oxidized liquid effluent and a gaseous phase in a single separation vessel before being routed to further treatment.

According to the process, a wet oxidized mixture is made to flow sequentially through two separator vessels, which provides an essentially gas-free oxidized liquid effluent, and a gaseous phase that has a reduced water vapor content, while reducing or eliminating the energy requirement for transporting the gaseous phase from a first location to a second location for further treatment, or to the environment. The reduced water vapor content is a result of the superatmospheric pressure used during first separation, which prevents the water from evaporating and going into the first gaseous phase. The term "reduced water vapor content," as used herein, means a reduced water vapor concentration, relative to the gaseous phase discharged from a system without a pressurized separator, and relative to the second gaseous phase discharged after the second separation which is performed at essentially atmospheric pressure. The reduction in water vapor content reduces the cost of additional downstream gaseous phase treatment, such as passage through a high temperature afterburner.

The improved separation process of the present invention is shown with reference to FIG. 1. A wet oxidized mixture at a first superatmospheric pressure, preferably from a subcritical wet oxidation system, flows from the wet oxidation system (not illustrated), into a conduit 10, and through a pressure control valve 12. As the mixture traverses the pressure control valve 12, it is subjected to a first pressure drop to a second superatmospheric pressure.

The mixture flows through another conduit 14 and into a first separator vessel 16, where the partially depressurized mixture separates into a first oxidized liquid effluent and a first gaseous phase. A demister device 24, which is known in the art, may be used to assist in phase separation within the first separation vessel 16. The pressure within the first separator vessel 16 is maintained at a relatively low superatmospheric pressure by a pressure controller 18, which operates a pressure control valve 20. Valve 20 controls the flow of the first gaseous phase through outlet conduit 22. The first gaseous phase exits near the top of the first separator vessel 16. A gas/liquid scrubber 21 may be located between the first separator vessel 16 and the pressure control valve 20 to condition the first gaseous phase stream flowing through the outlet conduit 22 prior to traversing the pressure control valve 20.

Preferably, the mixture is partially depressurized in the first separator vessel 16 to at least about 10 psig (0.68 atm(g)), although higher pressures may be used, or required, in some instances. The partially depressurized first gaseous phase retains sufficient motive force to be transported to any downstream location, including passage through all necessary control valves. Also in the first separation vessel 16, the first oxidized liquid effluent is maintained at a desired level by a level controller 26, which operates a level control valve 28. Valve 28 controls the flow of the first oxidized liquid effluent through outlet conduit 30, where the first oxidized liquid effluent exits the first separator vessel 16. In the first separator vessel 16, the majority of the noncondensible gases from the mixture enters the first gaseous phase. However, a portion of noncondensible gases may remain dissolved in the first oxidized liquid effluent, while it is contained in the first separator vessel 16, which is maintained at a superatmospheric pressure of at least about 10 psig (0.68 atm(g)).

As more of the oxidized effluent mixture from the wet oxidation system enters the first separator vessel 16, the pressure and liquid level in the first separator vessel 16 rises. The pressure controller 18 maintains the desired pressure of at least about 10 psig (0.68 atm(g)) in the first separator vessel 16 by modulating the flow of the first gaseous phase through the conduit 22 using the pressure control valve 20. As the liquid level rises, which is sensed by the level controller 26, a portion of the first oxidized liquid effluent, at the second superatmospheric pressure, flows through the exit conduit 30, through the level control valve 28, and through a conduit 32, to a second separator vessel 34.

The pressure in the second separator vessel is maintained at essentially atmospheric pressure. As the first oxidized liquid effluent traverses the pressure control valve 20, it is subjected to a second pressure drop to essentially atmospheric pressure. Therefore, as the first oxidized liquid effluent flows into the second separator vessel 34, the majority of dissolved gases remaining therein come out of solution, and are transferred to a second gaseous phase. The second gaseous phase may be combined with the first gaseous phase, or it may exit the second separator vessel 34 via a vent conduit 36. Preferably, a demister device 38 may be used to retain fine droplets of liquid in the second separator vessel 34. The liquid level in the second separator vessel 34 is maintained at a desired level by a second level controller 40, which operates a second level control valve 42. Valve 42 controls the flow of the second oxidized liquid effluent through conduit 44, where it exits the second separator vessel 34. A centrifugal pump 43 may be connected to outlet conduit 44, ahead of the level control valve 42, to assist in removing liquid from the second separator vessel 34.

As previously discussed, the majority of gases contained in the wet oxidation mixture separate into the first gaseous phase in the first separator vessel 16. Sufficient pressure is maintained in the first gaseous phase to provide the motive force to transport the first gaseous phase to further treatment, or waste, without the expenditure of additional energy. Moreover, smaller vessels and piping may be used when handling pressurized gases, providing an economic benefit for the process. Additionally, as a result of the superatmospheric pressure of the first separation, the first gaseous phase has a reduced water vapor concentration relative to the gaseous phase discharged from a system without a pressurized separator, and relative to the second gaseous phase discharged from the second separator of the present process. The reduced water vapor concentration the cost of additional downstream gaseous phase treatment, such as passage through a high temperature afterburner. Likewise, corrosion of the gaseous phase handling equipment in contact with water condensed from the gaseous phases is minimized by low humidity gases. Thus, the first superatmospheric separation improves the handling and further treatment of the first gaseous phase.

After discharging the first oxidized liquid effluent to the second separator vessel 34, operating at essentially atmospheric pressure, the majority of any remaining dissolved gases in the first oxidized liquid effluent come out of solution, and are transferred to the second gaseous phase. Therefore, after the second separation, the second oxidized liquid effluent is essentially free of dissolved gases. The second oxidized liquid effluent exits from the second separator vessel 34 via the exit conduit 44.

As stated previously, the majority of noncondensible gases are separated into the first gaseous phase, and only the gases remaining dissolved in the first oxidized liquid effluent are liberated within the second separator vessel 34. Therefore, the volume of the second gaseous phase generated in the second separator vessel 34 is generally quite small in relation to the volume of the first gaseous phase. Moreover, as the second oxidized liquid effluent is at a low pressure, problems associated with dissolved gases coming out of solution from the second, or final, oxidized liquid effluent in downstream treatment or storage are avoided. Finally, the first gaseous phase does not require the expenditure of additionally energy for transport.

In another aspect of the invention, the pH of the first or second oxidized effluent may be adjusted to a preselected range. Generally, it is desirable to adjust the final oxidized effluent to a pH at or near neutral prior to discharging to a downstream process. However, in some instances it may be desirable to discharge an extremely acidic or basic final oxidized liquid effluent to a downstream process. The pH adjusting steps will accommodate either of the previous situations. Accordingly, an appropriate pH adjusting substance, either acidic or basic, may be added to the first oxidized liquid effluent after it has passed from the first separator vessel 16 through the level control valve 28. The pH adjusting substance, stored in a tank 50, may be added to the first oxidized liquid effluent in the conduit 32 from a conduit 52 supplied from a pump 54 drawing from the tank 50. The amount of pH adjusting substance added is controlled by a pH controller 56 which monitors pH downstream of the addition point, such as within the second separator vessel 34.

For example, the first oxidized liquid effluent from the first separator vessel 16 may have a basic pH. Since further biological treatment requires a near neutral pH, the pH must be adjusted beforehand. The pH controller 56 adjusts the addition of acidic material to maintain the pH within the second separator vessel in a pH range of about 6 to about 8. In this instance, an acidic solution such as sulfuric or hydrochloric acid, may be added to the first oxidized liquid effluent in conduit 32, to neutralize the basic components to produce a second oxidized liquid effluent with a pH in the desired range, suitable for discharge. Similarly, an acidic first oxidized liquid effluent may require the addition of a solution of basic substance, such as caustic soda or metal carbonate, to neutralize the liquid to a pH suitable for discharge. Any addition of material to adjust the pH at this stage may result in the generation of additional gases, such as $CO_2$, in the second separator vessel 34.

In an alternative embodiment of the invention, the pH adjusting substance may be added to the wet oxidation mixture after it traverses the first pressure control valve 12, as it flows through the inlet conduit 14 to the first separator vessel 16. The pH adjusting substance may be added, for example, from a conduit 58, to which the pH adjusting substance is supplied from the pump 54, drawing from the tank 50, to produce a first oxidized liquid effluent in the first separator vessel 16 with a pH in the preselected range. Any addition of material to adjust the pH at this stage may also result in the generation of additional gases, which may enter the first gaseous phase.

While the invention has been particularly shown and described with reference to a preferred embodiment thereof, it will be understood by those skilled in the art that various changes in form and details may be made therein without departing from the spirit and scope of the invention.

What is claimed is:

1. A process for separating the discharge from a subcritical wet oxidation process, comprising:
    providing an oxidized liquid effluent mixture by reacting an aqueous waste stream containing oxidizable materials with an oxidant at a first superatmospheric pressure under subcritical conditions;
    providing a first oxidized liquid effluent and a first gaseous phase by subjecting the oxidized liquid effluent mixture to a first pressure drop from the first superatmospheric pressure to a second superatmospheric pressure; and
    providing a second oxidized liquid effluent and a second gaseous phase by subjecting the first oxidized liquid effluent to a second pressure drop from the second superatmospheric pressure to essentially atmospheric pressure;
    wherein the pressure exerted on the first gaseous phase provides energy for transporting the first gaseous phase from a first location to a second location.

2. The process of claim 1, wherein the second oxidized liquid effluent is essentially free of dissolved gases.

3. The process of claim 1, wherein the first gaseous phase has a reduced water concentration relative to the second gaseous phase.

4. The process of claim 1, wherein said second superatmospheric pressure is at least about 10 psig (0.68 atm(g)).

5. The process of claim 1, further comprising adjusting the pH of the first oxidized liquid effluent to a preselected range by adding a pH adjusting substance to the oxidation liquid effluent mixture after the mixture is subjected to the first pressure drop.

6. The process of claim 5, wherein the pH adjusting substance generates additional gases that are combined with the first gaseous phase.

7. The process of claim 1, further comprising adjusting the pH of the second oxidized liquid effluent to a preselected range by adding a pH adjusting substance to the second oxidized liquid effluent.

8. The process of claim 7, wherein the pH adjusting substance generates additional gases that are combined with the second gaseous phase.

9. A process for separating the discharge from a subcritical wet oxidation process, comprising:

discharging a cooled wet oxidation mixture of liquid and gases from a subcritical wet oxidation system operating at superatmospheric pressure, through a first pressure control valve to a first separator vessel maintained at a superatmospheric pressure lower than said oxidation system, to form a superatmospheric first gaseous phase and a first oxidized liquid effluent therein;

discharging said superatmospheric first gaseous phase from said first separator vessel to further treatment or to the environment;

discharging said first oxidized liquid effluent from said first separator vessel, through a first level control valve for controlling the liquid level in the first separator vessel, to a second separator vessel maintained at essentially atmospheric pressure, to form a second gaseous phase and an essentially degassed second oxidized liquid effluent therein;

discharging said second gaseous phase from said second separator vessel; and discharging said essentially degassed second oxidized liquid effluent from said second separator vessel.

10. The process according to claim 9, further comprising adjusting the pH of said first oxidized liquid effluent to a preselected range by adding a pH adjusting substance to said wet oxidation mixture after said mixture passes through said first pressure control valve.

11. The process according to claim 10, wherein said pH adjusting substance is an acidic material.

12. The process according to claim 11, wherein said pH adjusting of said first liquid effluent generates additional gases which enter said first gaseous phase.

13. The process according to claim 10, wherein said pH adjusting substance is a basic material.

14. The process according to claim 13, wherein said pH adjusting of said first oxidized liquid effluent generates additional gases which enter said first gaseous phase.

15. The process according to claim 9, further comprising adjusting the pH of said first oxidized liquid effluent from said first separator vessel to a preselected range by adding a pH adjusting substance thereto after said first oxidized liquid effluent is discharged through said first level control valve.

16. The process according to claim 15, wherein said pH adjusting substance is an acidic material.

17. The process according to claim 16, wherein said pH adjusting of said first oxidized liquid effluent generates additional gases which enter said second gaseous phase.

18. The process according to claim 15, wherein said pH adjusting substance is a basic material.

19. The process according to claim 18, wherein said pH adjusting of said first oxidized liquid effluent generates additional gases which enter said second gaseous phase.

20. The process according to claim 9, wherein said superatmospheric pressure in said first separator vessel is maintained by a pressure controller and a second pressure control valve which modulates the discharge of said first gaseous phase therefrom.

21. The process according to claim 9, wherein said superatmospheric pressure in said first separator vessel is at least about 10 psig (0.68 atm(g)).

22. The process according to claim 10, further comprising adjusting the pH of said second oxidized liquid effluent to a preselected range by adding a pH adjusting substance to said oxidation mixture after said mixture passes through said first level control valve.

23. The process according to claim 10, further comprising controlling the addition of said pH adjusting substance to said first oxidized liquid effluent with a pH controller that monitors pH downstream of said first separator vessel.

* * * * *

UNITED STATES PATENT AND TRADEMARK OFFICE
CERTIFICATE OF CORRECTION

PATENT NO.   : 6,190,564 B1                                              Page 1 of 1
DATED        : February 20, 2001
INVENTOR(S)  : Richard W. Lehmann and Russell G. Forbess It is certified that error appears in the above-identified patent and that said Letters Patent is hereby corrected as shown below:

<u>Title page,</u>
Item [73], the Assignee's address "Desert, CA" should read -- Palm Desert, CA --.

<u>Column 1,</u>
Line 66, "talk" should read -- tank --.

<u>Column 2,</u>
Line 3, "talk" should read -- tank --.
Line 21, "gasfree" should read -- gas-free --.

<u>Column 4,</u>
Line 47, "20" should read --28 --.

Signed and Sealed this

Twelfth Day of February, 2002

Attest:

JAMES E. ROGAN
*Attesting Officer*      *Director of the United States Patent and Trademark Office*